United States Patent
Krasner et al.

(10) Patent No.: US 11,151,057 B2
(45) Date of Patent: Oct. 19, 2021

(54) METHOD AND SYSTEM FOR EFFICIENTLY EVICTING DATA FROM MEMORY SLOTS IN A STORAGE SYSTEM

(71) Applicant: EMC IP Holding Company LLC, Hopkinton, MA (US)

(72) Inventors: Jonathan I. Krasner, Coventry, RI (US); Jason Jerome Duquette, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 207 days.

(21) Appl. No.: 16/705,323

(22) Filed: Dec. 6, 2019

(65) Prior Publication Data

US 2021/0173792 A1    Jun. 10, 2021

(51) Int. Cl.
*G06F 12/126*     (2016.01)
*G06N 5/04*       (2006.01)

(52) U.S. Cl.
CPC ............ *G06F 12/126* (2013.01); *G06N 5/04* (2013.01)

(58) Field of Classification Search
CPC ........ G06F 12/126; G06F 3/0644; G06N 5/04
See application file for complete search history.

(56) References Cited

U.S. PATENT DOCUMENTS

| | | | | |
|---|---|---|---|---|
| 2009/0006755 A1* | 1/2009 | Illikkal | ............... | G06F 11/3409 711/126 |
| 2013/0232295 A1* | 9/2013 | Benhase | ............... | G06F 12/128 711/103 |
| 2016/0117254 A1* | 4/2016 | Susarla | ............... | G06F 12/0897 711/119 |

* cited by examiner

*Primary Examiner* — Charles Rones
*Assistant Examiner* — Hewy H Li
(74) *Attorney, Agent, or Firm* — Chamberlain, Hrdlicka, White, Williams & Aughtry

(57) ABSTRACT

A method for managing data includes generating, by an offload device, predicted active logical partition data using an active logical partition mapping obtained from a host computing device, generating logical partition correlation data using active memory track maps obtained from the host computing device, generating most probable tracks using the predicted active logical partition data and the logical partition correlation data, and sending the most probable tracks to the host computing device, wherein the host computing device evicts data from a memory device based on the most probable tracks.

20 Claims, 9 Drawing Sheets

METHOD AND SYSTEM FOR EFFICIENTLY EVICTING DATA FROM MEMORY SLOTS IN A STORAGE SYSTEM

BACKGROUND

Computing devices may include any number of internal components such as processors, memory, and persistent storage. These internal components are typically limited resources within the computing devices. As such, the utilization of the aforementioned internal components may impact the overall performance of the computing devices.

SUMMARY

In general, in one aspect, the invention relates to a method for managing data. The method includes generating, by an offload device, predicted active logical partition data using an active logical partition mapping obtained from a host computing device, generating logical partition correlation data using active memory track maps obtained from the host computing device, generating most probable tracks using the predicted active logical partition data and the logical partition correlation data, and sending the most probable tracks to the host computing device, wherein the host computing device evicts data from a memory device based on the most probable tracks.

In general, in one aspect, the invention relates to a non-transitory computer readable medium that includes computer readable program code, which when executed by a computer processor enables the computer processor to perform a method for managing data. The method includes generating, by an offload device, predicted active logical partition data using an active logical partition mapping obtained from a host computing device, generating logical partition correlation data using active memory track maps obtained from the host computing device, generating most probable tracks using the predicted active logical partition data and the logical partition correlation data, and sending the most probable tracks to the host computing device, wherein the host computing device evicts data from a memory device based on the most probable tracks.

In general, in one aspect, the invention relates to an offload device that includes a processor and memory that includes instructions which, when executed by the processor, perform a method. The method includes active logical partition mapping obtained from a host computing device, generating logical partition correlation data using active memory track maps obtained from the host computing device, generating most probable tracks using the predicted active logical partition data and the logical partition correlation data, and sending the most probable tracks to the host computing device, wherein the host computing device evicts data from a memory device based on the most probable tracks.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for utilizing memory devices of a number of host computing devices. Specifically, embodiments of the invention relate to utilizing a host operating system (OS) of a host computing device to manage memory device usage. Specifically, embodiments of the invention include applying machine learning algorithms on current memory slot usage of memory devices and predicting whether the data stored in the memory devices will be used in the near future. The host computing device may perform a data cleanse on the memory device to evict the data that is currently stored in the memory device, which is predicted to not be used in the near future. In this manner, memory device may be optimally used by the host computing device (or virtual machines executing thereon).

Figure 1A:
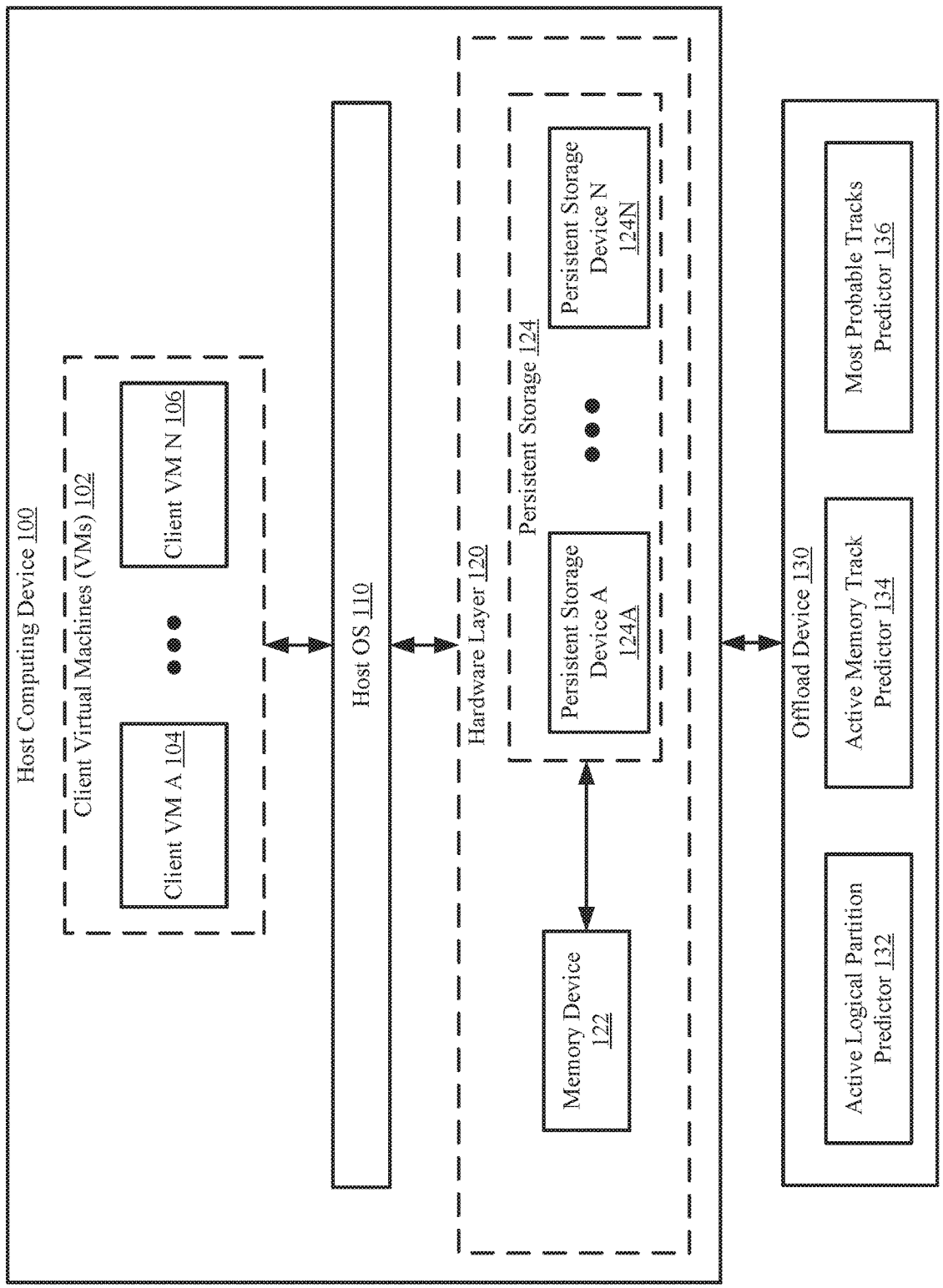
FIG. 1A shows a diagram of a system in accordance with one or more embodiments of the invention.

FIG. 1A shows a diagram of a system in accordance with one or more embodiments of the invention. The system may include a host computing device (100) and an offload device (130). The host computing device (100) may include any number of client virtual machines (VMs) (102), a host operating system (OS) (110), and a hardware layer (120). The system may include additional, fewer, and/or different components without departing from the invention. Each of the components illustrated in FIG. 1A is discussed below.

In one or more embodiments of the invention, the host computing device (100) hosts any number of client VMs (also referred to simply as VMs) (102). The client VMs (102) may be logical entities executed using computing resources (e.g., components of a hardware layer (120)) of the host computing device (100). Each of the VMs may be performing similar or different processes. In one or more embodiments of the invention, the VMs provide services to users, e.g., clients (not shown). For example, the VMs may host instances of databases, email servers, and/or other applications. The VMs may host other types of applications without departing from the invention.

In one or more embodiments of the invention, each client VM (104, 106) operates using a guest operating system (OS) executing in the client VM. The guest OS may enable the aforementioned users to operate the VM, and may further enable the client VMs (104, 106) to utilize the components of the hardware layer (e.g., 120) of the host computing device (100).

In one or more of embodiments of the invention, the VMs (102) are implemented as computer instructions, e.g., computer code, stored on a persistent storage that when executed by a processor(s) of the host computing device (100) cause the host computing device (100) to provide the functionality of the VMs (102, 104) described throughout this application.

In one or more embodiments of the invention, the host computing device (100) operates using a host OS (110). The host OS (110) is software that includes an operating system that manages the operation of the client VMs (102) and the hardware layer (120). The host OS (110) may further include functionality for managing the memory devices (124) in the hardware layer (120). The host OS (110) may obtain information from the offload device (130) to determine how to cleanse (e.g., remove data from) the memory devices (124). The host OS (110) may manage the memory device cleansing via the method of FIG. 2D. The host OS may manage the memory device cleansing via other methods without departing from the invention.

In one or more embodiments of the invention, the host OS (110) is implemented as computer instructions, e.g., computer code, stored on a persistent storage that when executed by a processor(s) of the host computing device (100) cause the host computing device (100) to provide the functionality of the host OS (110) described throughout this application.

In one or more embodiments of the invention, the hardware layer (120) includes computing resources utilized by components (e.g., the host OS (110), client VMs (102)) of the host computing device (100) to perform the functionalities specified by each respective component. The computing resources may include at least one memory device (122) and persistent storage devices (124). Each computing resource of the hardware layer (120) may be operably connected via any combination of wired and/or wireless connections. Each computing resource of the hardware layer (120) is discussed below.

In one or more embodiments of the invention, the memory device (122) is a device that includes physical memory segments. Examples of memory devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level". For additional details regarding the memory device (322), see, e.g., FIG. 1C.

In one or more embodiments of the invention, the persistent storage devices (124A, 124N) store data persistently. In other words, the data stored in the persistent storage devices (124) may not be lost if power to the persistent storage devices (124) is lost. Further, the data stored in the persistent storage devices (124) may not be accessed directly by the client VMs (202) or the host OS (210). The data stored in the persistent storage devices (124) may be accessed via the memory device (122). The data may be transferred from a persistent storage device (124A, 124N) to the memory device (122) by writing to a memory slot in the memory device (discussed in FIG. 1C) and accessed from the memory device (122). The data may be accessed from other entities without departing from the invention.

Examples of "persistent storage" (236) include, but are not limited to, certain integrated circuit storage devices (e.g., solid-state drive (SSD), Non-Volatile Memory Express (NVMe) etc.), magnetic storage (e.g., hard disk drive (HDD), floppy disk, tape, diskette, etc.), or optical media (e.g., compact disc (CD), digital versatile disc (DVD), etc.).

Figure 4:
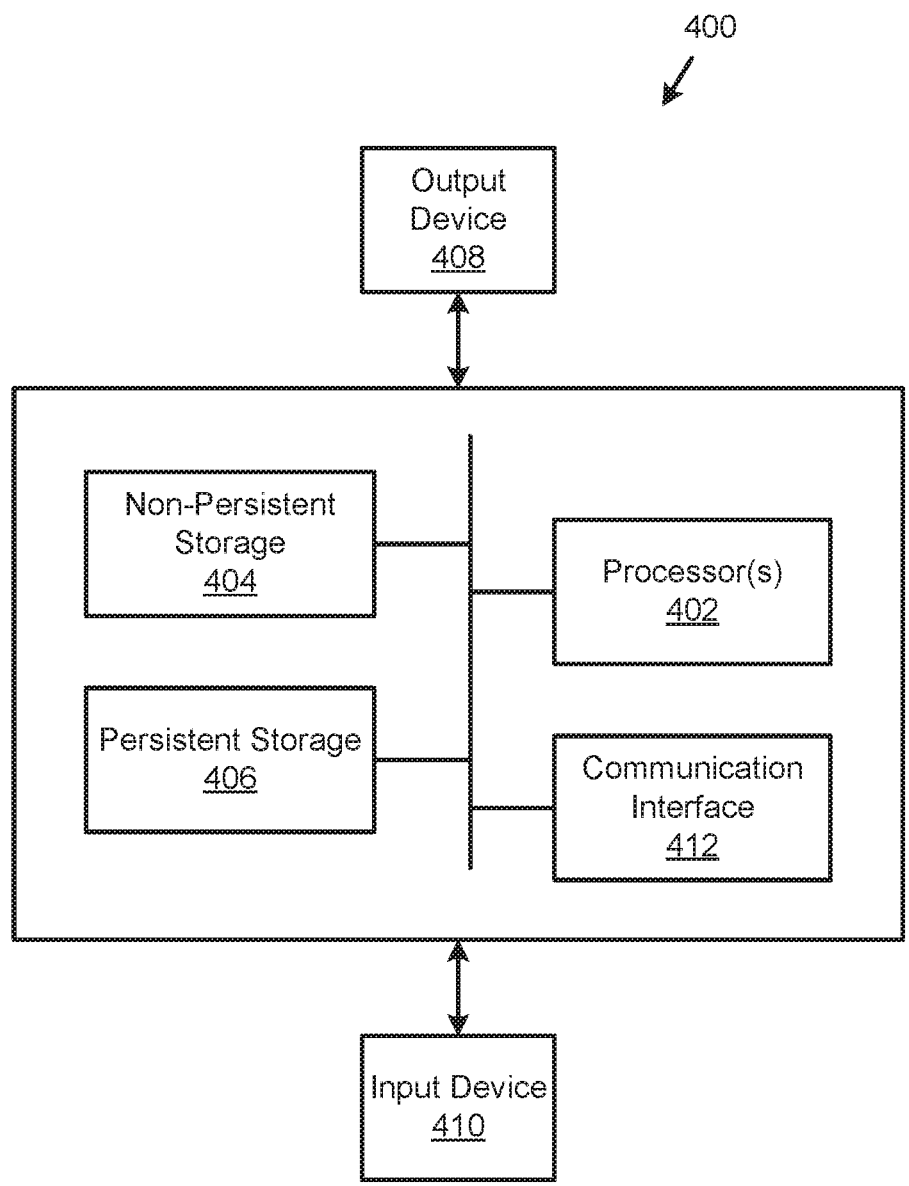
FIG. 4 shows a diagram of a computing device in accordance with one or more embodiments of the invention.

In one or more embodiments of the invention, the host computing device (100) is implemented as a computing device (see, e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host computing device (100) described throughout this application and/or all, or a portion thereof, of the method described in FIG. 2D.

In one or more embodiments of the invention, the offload device (130) monitors the usage of the memory device (122) and performs predictions for future memory usage. To perform the aforementioned functionality, the offload device (130) includes an active logical partition predictor (ALPP) (132), an active memory track predictor (AMTP) (134), and a most probably tracks predictor (MPTP) (136). Each of these components is described below.

In one or more embodiments of the invention, the ALPP (132) includes functionality to obtain information regarding the active logical partitions from the metadata stored in the memory device (122). Specifically, the ALPP obtains a current active logical partition mapping. In one or more embodiments of the invention, the current active logical partition mapping is a data structure that specifies the active logical partitions at a specified point in time. An active logical partition may refer to a logical partition of address space in the persistent storage devices (124) from which data is read and/or written to at the specified point in time.

In one or more embodiments of the invention, the ALPP (132) further includes functionality to perform predictions for future active logical partitions. The predictions may be performed based on the methods discussed in FIG. 2A. The result of the predictions may be sent to the MPTP (136).

In one or more embodiments of the invention, the AMTP (134) includes functionality to obtain information regarding the associations between logical partitions in the memory device (122). Specifically, the information specifies the tracks in the memory device (122) and which logical partitions are associated with each track. The tracks in the memory device (122) store data units, and each data unit may be associated with a logical partition. A track may store data from one or more logical partitions, and the associations between each track and the logical partitions may be obtained by the AMTP (134). Additional detail about tracks is provided below FIG. 1C.

In one or more embodiments of the invention, the AMTP (124) further includes functionality to perform predictions for future logical partition correlations. The predictions may be performed based on the methods discussed in FIG. 2B. The result of the predictions may be sent to the MPTP (136).

In one or more embodiments of the invention, the MPTP (136) includes functionality to obtain predictions about future active logical partitions (e.g., which logical partitions will likely be used in a next time interval). The aforementioned predictions generated by the MPTP (136) may be sent to the host computing device (100) to be used to determine, which memory devices (or portions thereof) are to be cleansed.

Figure 2A:
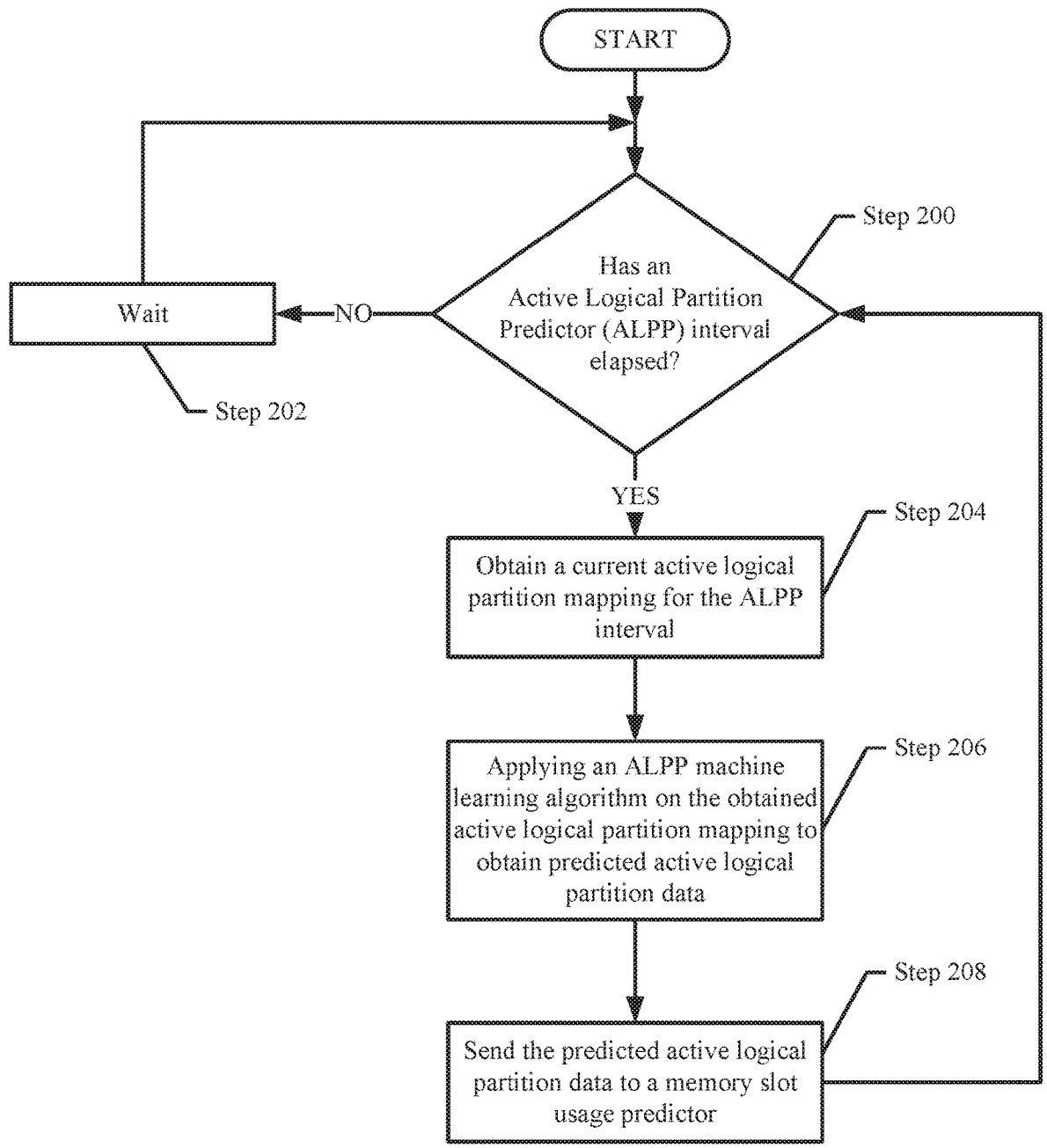
FIG. 2A shows a flowchart for predicting future active logical partitions in accordance with one or more embodiments of the invention.
Figure 2B:
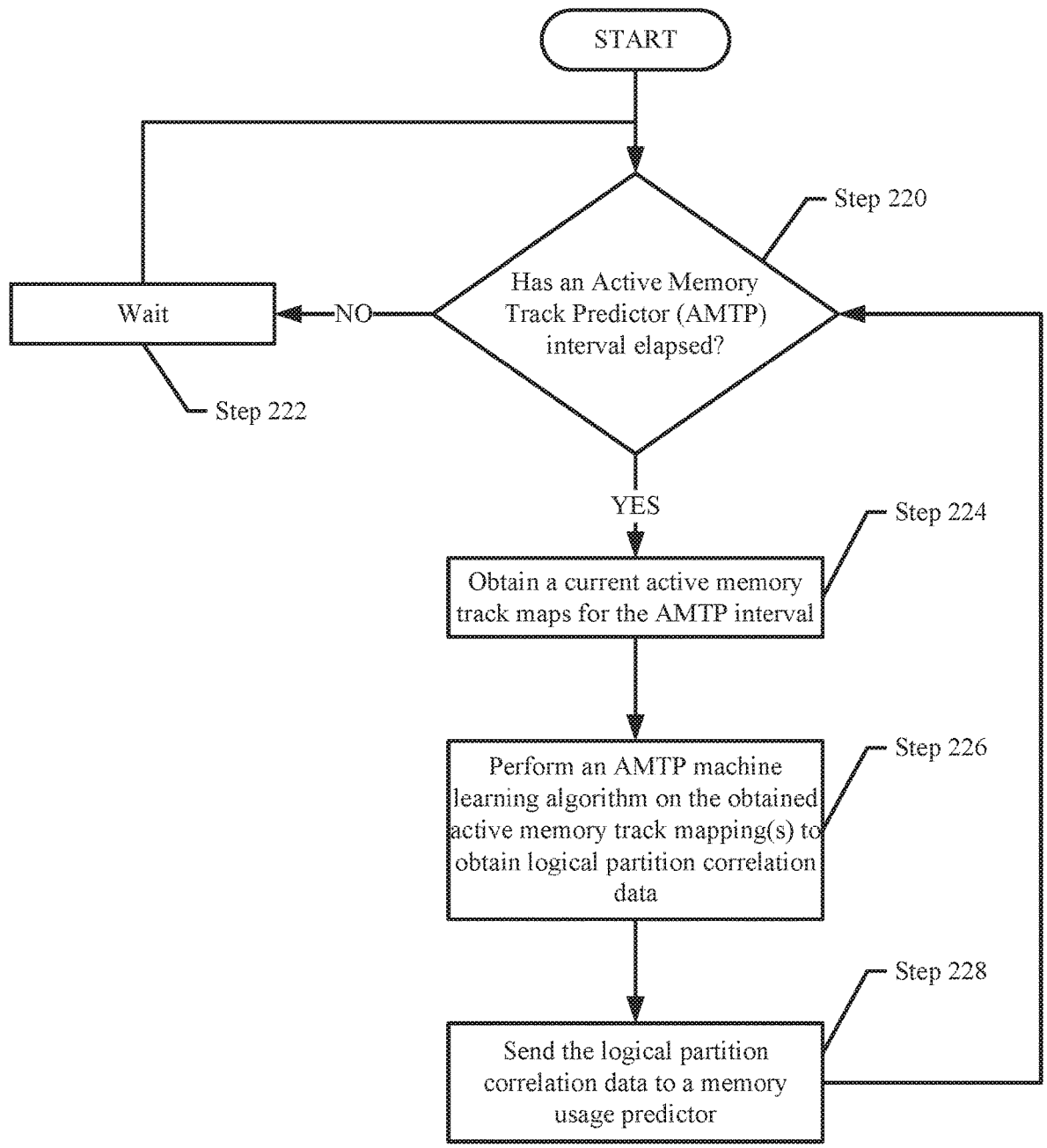
FIG. 2B shows a flowchart for predicting memory track correlations in accordance with one or more embodiments of the invention.
Figure 2C:
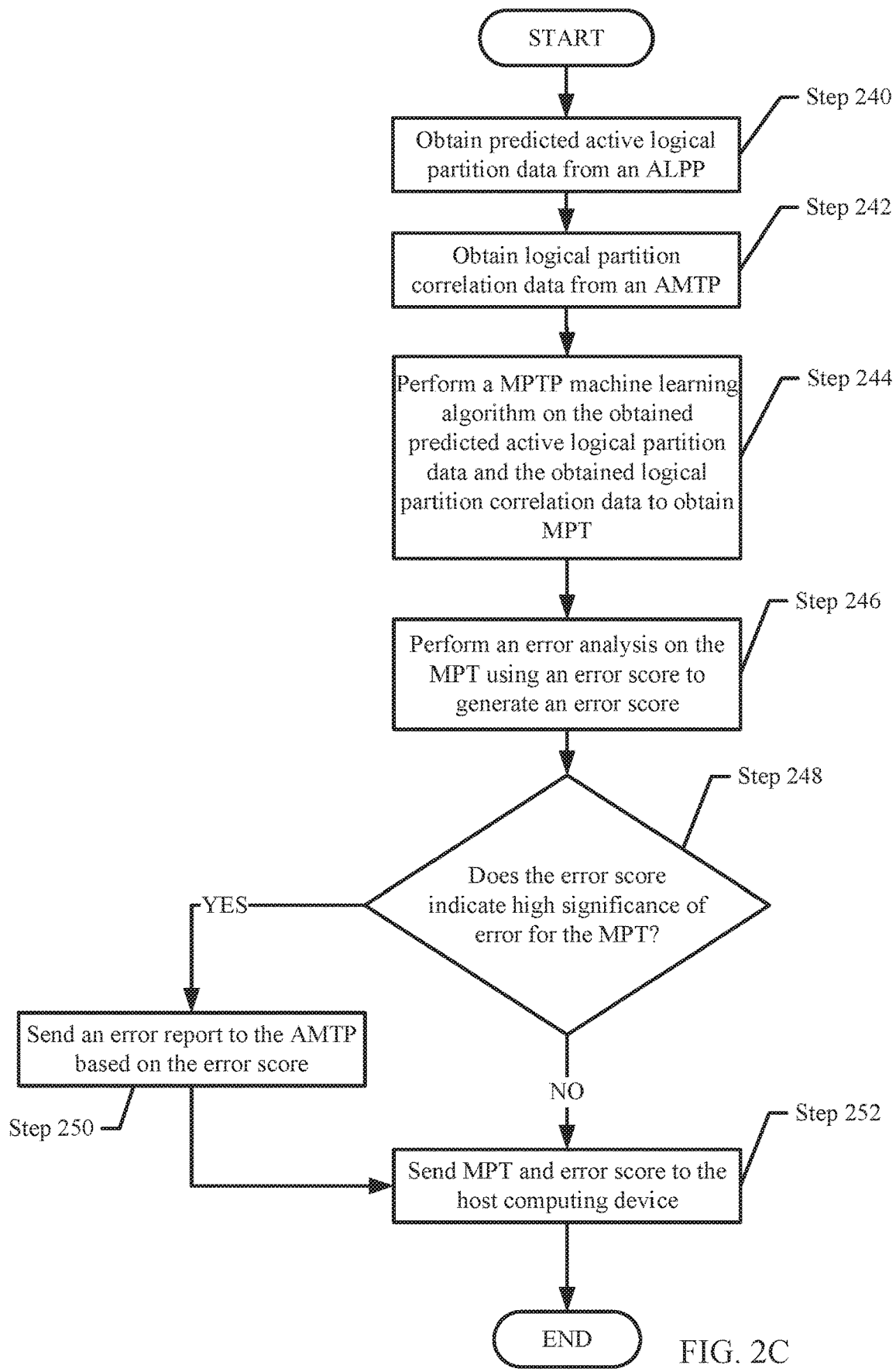
FIG. 2C shows a flowchart for predicting most probably tracks (MPT) in accordance with one or more embodiments of the invention.

In one or more of embodiments of the invention, the offload device (130) is implemented as computer instructions, e.g., computer code, stored on a persistent storage that when executed by a processor of the host computing device (100) cause the host computing device (100) to provide the functionality of the offload device (130) described throughout this application and/or all, or a portion thereof, of the methods illustrated in FIGS. 2A-2C.

In one or more embodiments of the invention, the offload device (130) is implemented as a computing device (see, e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the offload device (130) described throughout this application and/or all, or a portion thereof, of the methods illustrated in FIGS. 2A-2C.

Figure 1B:
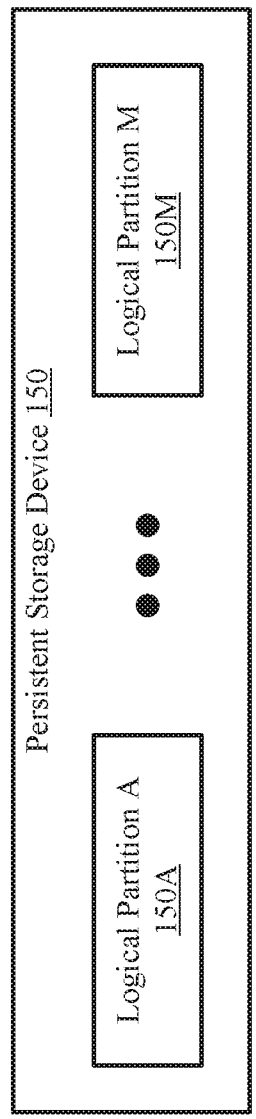
FIG. 1B shows a diagram of a persistent storage device in accordance with one or more embodiments of the invention.

FIG. 1B shows a diagram of a persistent storage device in accordance with one or more embodiments of the invention. The persistent device (150) may be an embodiment of a persistent storage device (124A, 124N) discussed above. The persistent storage device (150) may be partitioned into one or more logical partitions (150A, 150M). The memory device (150) may include additional, fewer, and/or different components without departing from the invention.

In one or more embodiments of the invention, a logical partition (150A, 150M) of a persistent storage device corresponds to a portion of the persistent storage device (150). Any known or later discovered mechanism may be used for creating logical partitions of the persistent storage device.

In one or more embodiments of the invention, each logical partition (150A, 150M) may be uniquely identified with a logical partition identifier. The logical partition identifier may be, for example, any combination of numbers, letters, and/or symbols that each identify a memory device (124A, 124N). The logical partition identifier may be, for example, a logical unit number (LUN).

Figure 1C:
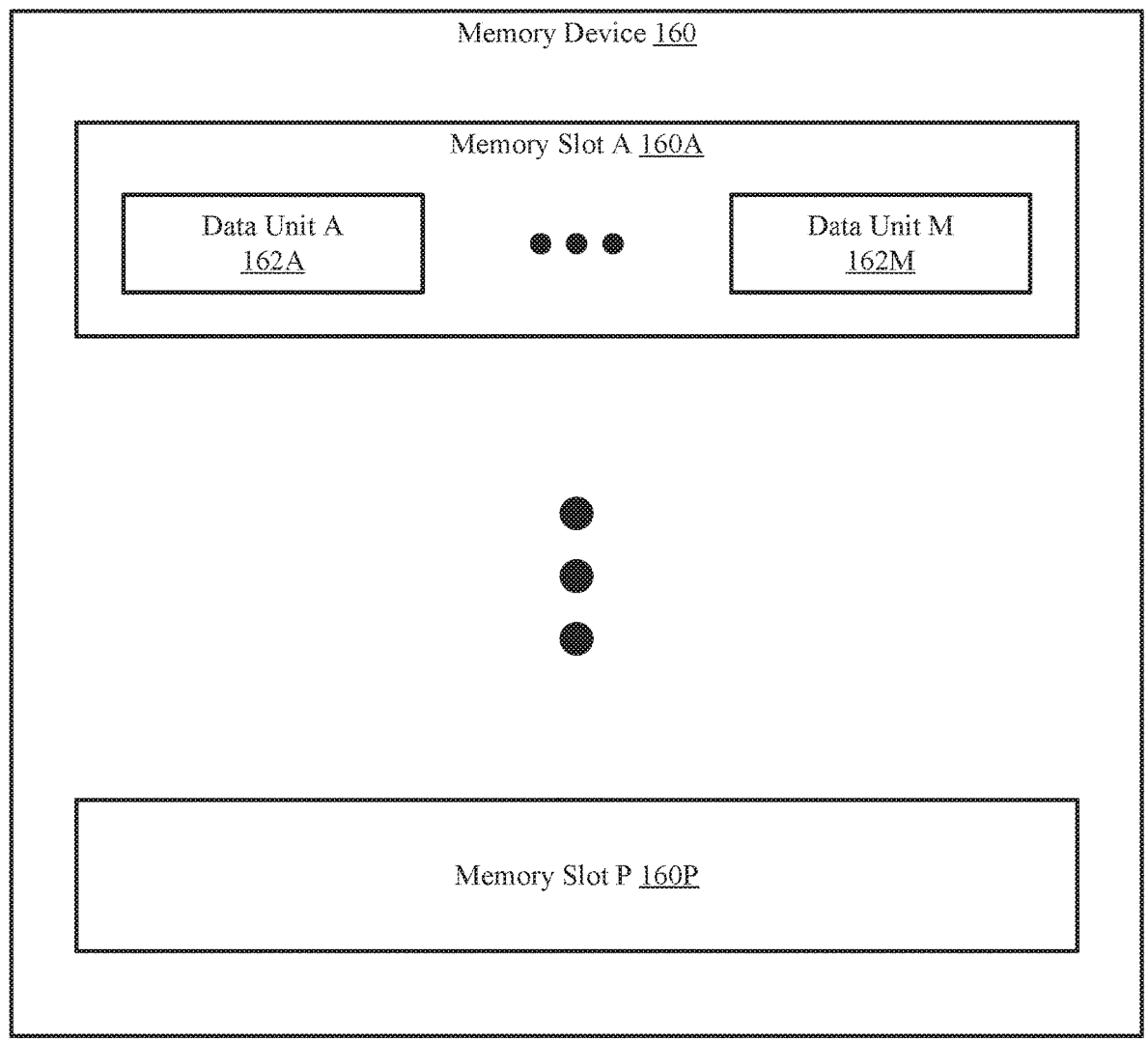
FIG. 1C shows a diagram of a memory device in accordance with one or more embodiments of the invention.

FIG. 1C shows a diagram of a memory device in accordance with one or more embodiments of the invention. The memory device (160) may be an embodiment of the memory device (122) discussed above. The memory device (160) may include one or more memory slots (160A, 160M). The memory device (160) may include additional, fewer, and/or different components without departing from the invention.

In one or more embodiments of the invention, each memory slot (150A, 150M) is associated with an address range and is able to store data. The data may be data obtained from the client VMs, from the host OS, and/or from any other component in the host computing device. In one or more embodiments of the invention, the memory slots (160A, 160M) may each store one or more data units (162A, 162M). The data unit may be written to a memory slot (160A, 160P) from a client VM or from a persistent storage device. The data units (162A, 162M) may be of uniform size to other data units of a memory slot or of varying sizes without departing from the invention. For example, a first data unit in a memory slot may be 8 kilobytes (KB) in size. Further, each memory slot may be of uniform size. For example, the memory slot may be able to store 128 KB of data, which is made up of 16 data units. The invention is not limited to the aforementioned examples.

In one or more embodiments of the invention, a given memory slot may store a set of data units, where each data unit is associated with a logical partition. For example, the data unit may be ultimately written to a logical partition. However, all of the data units in a given memory slot do not need to be written to the same logical partitions; rather, each of the data units in the memory slot may be written to different logical partitions. The set of logical partitions that are associated with the data units in the memory slot may be referred to as a track.

While FIGS. 1A-1C shows the architecture of the host computing device, the invention is not limited to the architecture shown in FIGS. 1A-1C.

FIGS. 2A-2D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2D may be performed in parallel with any other steps shown in FIG. 2A-2D without departing from the scope of the invention.

FIG. 2A shows a flowchart for predicting future active logical partitions in accordance with one or more embodiments of the invention. The method shown in FIG. 2A may be performed by, for example, an ALPP (132, FIG. 1A). Other components of the system illustrated in FIG. 1A may perform the method of FIG. 2A without departing from the invention.

Turning to FIG. 2A, in step 200, a determination is made about whether an ALPP interval has elapsed. In one or more embodiments of the invention, the ALPP interval is a time interval predetermined by the ALPP. The time interval may be, for example, one minute and/or any other predetermined time interval without departing from the invention. If an ALPP interval has elapsed, the method proceeds to step 204; otherwise, the method proceeds to step 202.

In step 202, the ALPP waits. The amount of time spent waiting may be predetermined by the ALPP.

In step 204, a current active logical partition mapping is obtained. In one or more embodiments of the invention, the current active logical partition mapping is obtained as, for example, a list that specifies the active logical partitions in the persistent storage during the last ALPP interval.

In step 206, an ALPP machine learning algorithm is applied to the obtained current active logical partition mapping to obtain a predicted active logical partition data. In one or more embodiments of the invention, an ALPP machine learning algorithm is a machine learning algorithm that the ALPP is configured to generate the predicted active logical partition data. In one or more embodiments of the invention, the machine learning algorithm may include inputting the current active logical partition mapping to a machine learning model and producing an output that includes the predicted active logical partition data. Any information in the current active logical partition mapping may be used as parameters that further enable the machine learning model to produce the predicted active logical partition data.

In one or more embodiments of the invention, the machine learning model may be selected by an administrator of the offload device. The machine learning model may be selected based on, for example, the ability of the machine learning model to incorporate recurring data. The machine learning model may be, for example, a recurring neural net (RNN) model. The selected machine learning model may be other machine learning models without departing from the invention. For example, step 206 may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

In step 208, the predicted active logical partition data is sent to a MPTP. In one or more embodiments of the invention, the predicted active logical partition data may specify one or more logical partitions and, for each logical partition, whether or not the memory device is likely to be active within the following ALPP interval. Further, the predicted active logical partition data may specify a likelihood that the logical partition will be active in the aforementioned ALPP interval. The likelihood may be represented by, for example, a numerical value (e.g., a percentage).

FIG. 2B shows a flowchart for predicting future active memory slots in accordance with one or more embodiments of the invention. The method shown in FIG. 2B may be performed by, for example, an AMTP (134, FIG. 1A). Other components of the system illustrated in FIG. 1A may perform the method of FIG. 2B without departing from the invention.

In step 220, a determination is made about whether an AMTP interval has elapsed. In one or more embodiments of the invention, the AMTP interval is a time interval predetermined by the AMTP. The time interval may be, for example, one minute, and/or any other predetermined time interval without departing from the invention. The AMTP interval may be independent from the ALPP interval. If an AMTP interval has elapsed, the method proceeds to step 224; otherwise, the method proceeds to step 222.

In step 222, the AMTP waits. The amount of time spent waiting may be predetermined by the AMTP.

In step 224, current active memory track maps is obtained. In one or more embodiments of the invention, the current active memory track maps are obtained as, for example, data structures that specifies the active memory tracks in the memory device of the host computing device. The current active memory track maps may further specify additional information that may be used to predict future active memory slots. The additional information may include, for example, a listing of logical partitions associated with each memory slot.

For example, a memory slot store data units that collectively are associated with logical partitions A, B, and C. In this example, if the data units in the aforementioned memory slot are written to persistent storage (i.e., to the persistent storage associated with logical partitions A, B, C) during the time interval, then current active memory track map for this memory slot is [A, B, and C].

In step 226, an AMTP machine learning algorithm on the obtained active memory device mapping to obtain logical partition correlation data. In one or more embodiments of the invention, an AMTP machine learning algorithm is a machine learning algorithm that the AMTP is configured to implement in order to generate the logical partition correlation data. In one or more embodiments of the invention, the machine learning algorithm may include inputting the current active memory track maps to a machine learning model and producing an output that includes the predicted logical partition correlation data. Any information in the current active logical partition mapping may be used as parameters that further enable the machine learning model to produce the predicted active logical partition data.

In one or more embodiments of the invention, the machine learning model may be selected by an administrator of the offload device. The machine learning model may be selected based on, for example, the ability of the machine learning model to perform deep learning to a large number of parameters. The machine learning model may be, for example, a deep learning convolutional neural net model. The selected machine learning model may be other machine learning models without departing from the invention. For example, step 226 may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

In one or more embodiments of the invention, the logical partition correlation data may specify correlations between logical partitions that may be used to predict future memory usage. For example, if logical partitions A, B, and C are often associated with a track, then the logical partition correlation data may specify logical partitions A, B, and C. The correlation may be used to predict whether logical partition A and logical partition B will be active together in a future time slot. The correlations may be specified via, for example, a numerical representation of the strength of the correlation. The correlations may be specified via other mechanisms without departing from the invention.

In step 228, the logical partition correlation data is sent to a MPTP. In one or more embodiments of the invention, the logical partition correlation data may specify one or more sets of logical memory partitions likely to be active within the following AMTP interval. Further, the logical partition correlation data may specify a likelihood that each set of logical partitions will be active in the aforementioned AMTP interval. The likelihood may be represented by, for example, a numerical value (e.g., a percentage).

FIG. 2C shows a flowchart for predicting most probable tracks (MPT) in accordance with one or more embodiments of the invention. The method shown in FIG. 2C may be performed by, for example, a MPTP (136, FIG. 1A). Other components of the system illustrated in FIG. 1A may perform the method of FIG. 2C without departing from the invention.

In step 240, predicted active logical partition data is obtained from an ALPP.

In step 242, logical partition correlation data is obtained from an AMTP. In one or more embodiments of the invention, the predicted active logical partition data of step 240 is obtained after the logical partition correlation data of step 242. In other words, the order in which the aforementioned data structures are obtained may be interchanged with each iteration of the method of FIG. 2C In step 244, a MPTP machine learning algorithm is performed on the obtained predicted active logical partition data and the logical partition correlation data to obtain MPT. In one or more embodiments of the invention, a MPTP machine learning algorithm is a machine learning algorithm that the MPTP is configured to generate the MPT. In one or more embodiments of the invention, the machine learning algorithm may include inputting the obtained predicted active logical partition data and the logical partition correlation data to a machine learning model and producing an output that includes the MPT.

In one or more embodiments of the invention, the machine learning model may be selected by an administrator of the offload device. The machine learning model may be, for example, a recurring neural net (RNN) model. The selected machine learning model may be other machine learning models without departing from the invention. For example, step 244 may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

In one or more embodiments of the invention, the MPT is a data structure that specifies which sets of logical partitions are likely to be active in the next interval (which may be the ALPP interval, the ATMP interval, or another interval).

In step 246, an error analysis is performed on the MPT using an error score to generate a significance of error. In one or more embodiments of the invention, the error analysis is based on secondary sources (e.g., an administrator's configuration) that may compare the MPT to realistic predictions obtained by the secondary sources. For example, an administrator may provide, as an input to the error analysis, a high likelihood that logical partitions A and B will be active. The input may be compared to the predicted likelihood of the MPT that logical partitions A and B will be active. If the likelihoods do not specify similar results, the error analysis may result in generating an error score with a high significance of error. Other methods for determining whether the MPT is accurate (within an acceptable range) may be used without departing from the invention.

In step 248, a determination is made about whether the error score indicates a high significance of error for the MPT. In one or more embodiments of the invention, a significance of error may determine how erroneous the MPT is likely to be. A high significance of error indicates highly erroneous MPT. In contrast, a low significance of error may indicate low erroneous MPT. The error score may be a numerical representation of the significance of error. If the error score indicates a high significance of error, the method proceeds to step 250; otherwise, the method proceeds to step 252.

In step 250, an error report is sent to the AMTP based on the error report. In one or more embodiments of the invention, the error report may specify the error score generated in step 246. The error report may be used to update and/or otherwise improve the AMTP machine learning algorithm for more accurate predictions of logical partition correlations.

In step 252, a MPT and error score is sent to the host computing device.

Figure 2D:
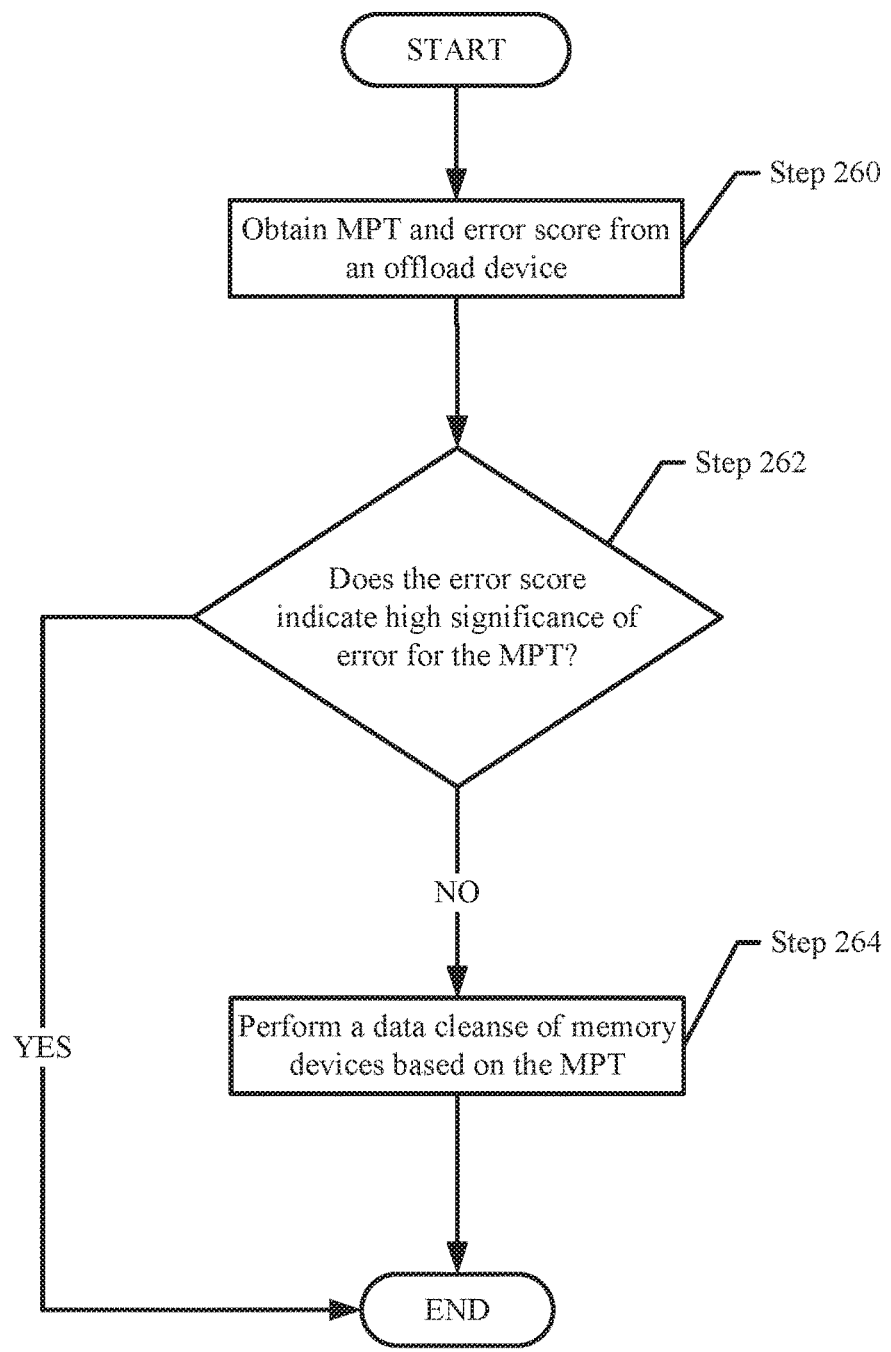
FIG. 2D shows a flowchart for managing memory devices in accordance with one or more embodiments of the invention.

FIG. 2D shows a flowchart for managing memory devices in accordance with one or more embodiments of the invention. The method shown in FIG. 2D may be performed by, for example, a host OS (110, FIG. 1A). Other components of the system illustrated in FIG. 1A may perform the method of FIG. 2D without departing from the invention.

In step 260, a MPT and error score is obtained from an offload device.

In step 262, a determination is made about whether the error score indicates a high significance of error for the MPT. If the error score indicates a high significance of error, the method ends following step 262; otherwise, the method proceeds to step 264. The host computing device may use any method to determine whether the MPT should (or should not be used) for cleansing the memory slots.

In step 264, a data cleanse is performed on one or more memory devices based on the MPT. In one or more embodiments of the invention, the MPT specifies which logical partitions are likely to be active during a next time interval (as discussed above). The host computing device may then use this information to determine which logical partitions are likely to not be active during the next interval (i.e., inactive logical partitions).

Once the set of likely inactive logical partitions is identified, the host computing device may then determine which memory slots currently include data units associated with the inactive logical partitions. The host computing device may use metadata associated with the data units to make the aforementioned determination. The metadata may be stored within the data units (e.g., in metadata portion of the data unit) or may be stored in a separate data structure that is maintained by the host computing device.

Once the memory slots that include data units associated with the inactive logical partitions are identified, the data units are removed from these memory slots. The memory slots may include only data units associated with the inactive logical partitions and/or may have data units associated with active and inactive logical partitions. In the latter scenarios, the host computing system may determine: (i) to clear any memory slots that include any data units that are associated with inactive logical partitions or (ii) only clear memory slots that include a certain percentage (or portion) of data units associated with the inactive logical partitions.

The result of the data cleanse is a memory device that stores data in memory slots that is predicted to be used in the future and does not include (or has fewer) data units stored in its memory slots that are not predicted to be used in the future. This results in more memory slots being available for use in the next interval.

EXAMPLE

Figure 3:
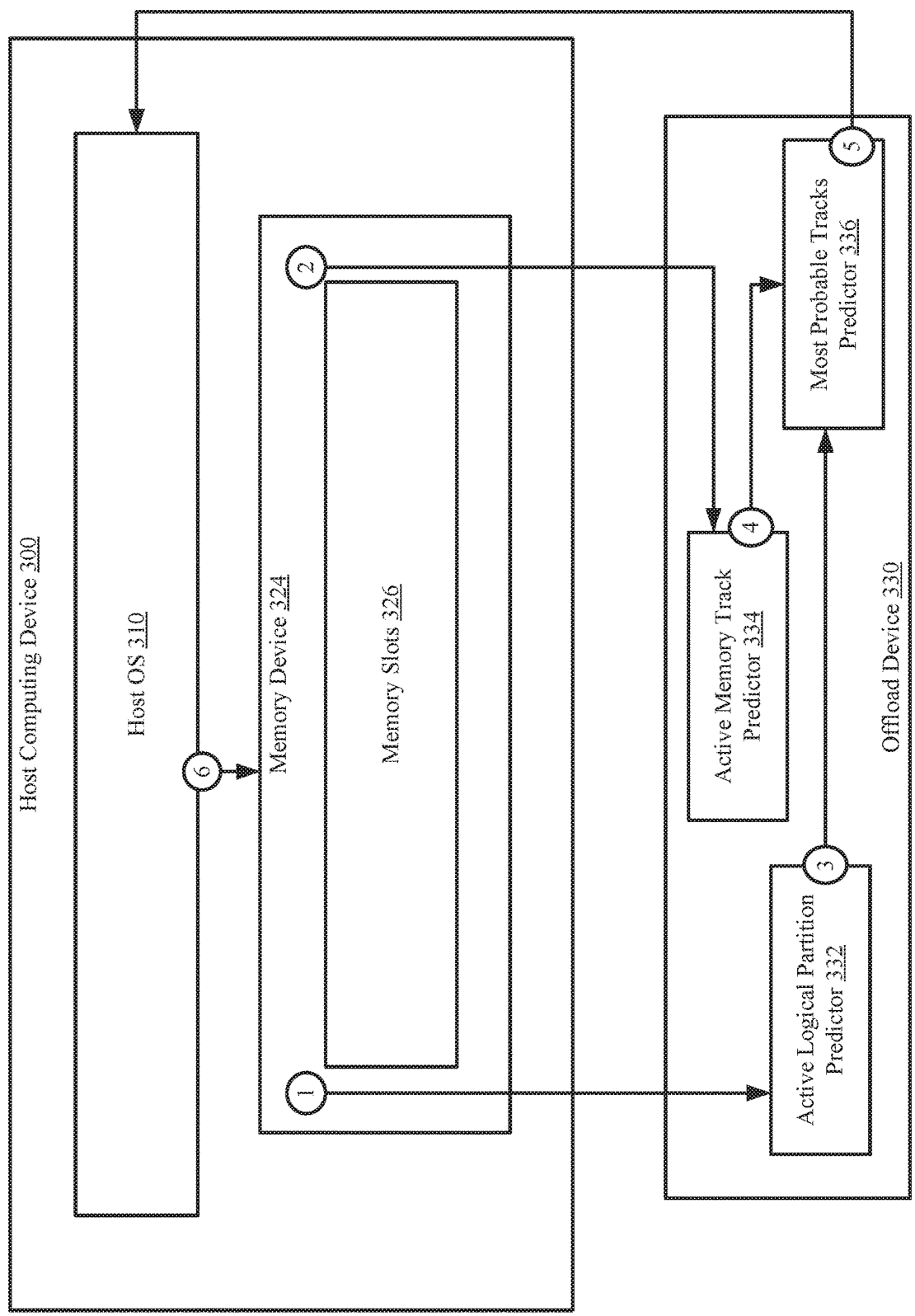
FIG. 3 shows an example in accordance with one or more embodiments of the invention.

The following section describes an example. The example, illustrated in FIG. 3, is not intended to limit the invention. Turning to the example, consider a scenario in which a host computing device (300) stores data in memory.

FIG. 3 shows an example system. The example system includes the host computing device (300) and an offload device (330). The host computing device (300) includes a host OS (310) and a memory device (324) that includes four memory slots (326). The offload device (330) includes an active logical partition predictor (ALPP) (332), an active memory track predictor (AMTP) (334), and a most probable tracks predictor (MPTP) (336).

The memory slots (324) store data units in accordance with Table A:

| Memory Slot | Data Unit (associated logical partition) | Data Unit (associated logical partition) | Data Unit (associated logical partition) | Data Unit (associated logical partition) |
|---|---|---|---|---|
| 1 | AA(LP1) | AB(LP3) | AC(LP3) | AD(LP1) |
| 2 | BA(LP2) | BB(LP4) | BC(LP4) | BD(LP2) |
| 3 | CA(LP1) | CB(LP3) | CC(LP1) | CD(LP1) |
| 4 | DA(LP2) | DB(LP5) | DC(LP4) | DD(LP1) |

Table A illustrates the data units stored in each memory slot in the memory device (324). Based on Table A, a first track (i.e., the track for memory slot 1) is [LP1, LP3, LP3, LP1]. A second track (i.e., the track for memory slot 2) includes [LP2, LP4, LP4, LP2]. A third track (i.e., the track for memory slot 3) includes [LP1, LP3, LP1, LP1]. A fourth track (i.e., the track for memory slot 4) includes [LP2, LP5, LP4, LP1].

At [1], the ALPP obtains a current active logical partition mapping. The current active logical partition mapping specifies the active logical partitions in a previous specified ALPP interval. The active logical partitions in the previous ALPP interval are specified to be logical partitions LP1 and LP6.

The ALPP performs the method of FIG. 2A to generate predicted active logical partition data. The generated predicted active logical partition data specifies that LP1 is likely to be active in the following ALPP interval. LP2, LP3, LP4, LP5, and LP6 are predicted to not be active during the ALPP interval.

At [2], the AMTP (334) obtains current active memory track maps for the memory slots. The current active memory tracks are [LP1, LP3, LP3, LP1] and [LP1, LP3, LP1, LP1]. The AMTP (334) performs the method of FIG. 2B to generate logical partition correlation data. The logical partition correlation data specifies that LP1 and LP3 are correlated.

At [3], the predicted active logical partition data is sent to the MPTP (336).

At [4], the logical partition correlation data is sent to the MPTP (336).

At [5], the MPTP performs the method of FIG. 2C to generate MPT based on the obtained predicted active logical partition and the logical partition correlation data. The MPT specifies LP1 is likely to be active and that, based on the correlation between LP1 and LP3, that LP3 is also likely to be active. The MPTP also generates are error report for the MPT, which in this example specifies a low error score. The MPTP then sends MPT to the host OS (310) along with the error score.

At [6], the host OS (310) performs the method of FIG. 2D to perform a data cleanse of data in the memory device (324). Specifically, the host OS (310) identifies that LP1 and LP3 are likely to be active using the MPT. The memory slots that include data units associated with the predicted inactive LPs (e.g., LP2, LP3, LP4, and LP5) are identified. In this example, memory slots 2 and 4 are identified. Subsequently, data units BA, BB, BC, BD, DA, DB, DC, and DD are deleted from the memory device (324). The memory slots that are cleansed may be used to write other data from other logical partitions.

END OF EXAMPLE

As discussed above, embodiments of the invention may be implemented using computing devices. FIG. 4 shows a diagram of a computing device in accordance with one or more embodiments of the invention. The computing device (500) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing resources such as memory by enabling computing devices to predict the usage of memory slots in memory devices to preemptively cleanse stale data (e.g., data that has not been used for a while and is likely not to be used). Embodiments of the invention track logical partitions to determine whether the logical partitions are active, and collect data based on the tracking. The data is input to a machine learning algorithm to obtain most probable tracks. The most probable tracks are used to identify which data is not likely to be used and may be evicted from the memory device. In such manner, the entities that attempt to utilize the memory device may be presented with more available memory space.

Thus, embodiments of the invention may address the problem of inefficient use of computing resources. This problem arises due to the technological nature of the environment in which data processing is performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
generating, by an offload device, predicted active logical partition data using an active logical partition mapping obtained from a host computing device;
generating logical partition correlation data using active memory track maps obtained from the host computing device;
generating most probable tracks using the predicted active logical partition data and the logical partition correlation data; and
sending the most probable tracks to the host computing device,
wherein the host computing device evicts data from a memory device based on the most probable tracks.

2. The method of claim 1, wherein the memory device comprises at least a plurality of memory slots.

3. The method of claim 1, wherein the active logical partition mapping specifies a plurality of logical partitions, wherein each of the plurality of logical partitions is associated with a persistent storage device in the host computing device.

4. The method of claim 1, wherein the method further comprises:
performing an error analysis on the most probable tracks to generate an error score; and
generating an error report based on the error score.

5. The method of claim 4, wherein the error score is sent to the host computing device if the error score exceeds a significance of error.

6. The method of claim 1, wherein the predicted active logical partition data is generated after an active logical partition predictor (ALPP) time interval.

7. The method of claim 1,
wherein the active memory track maps specify a plurality of active tracks, and
wherein each active track in the plurality of active tracks is associated with at least one logical partition.

8. A non-transitory computer readable medium comprising computer readable program code, which when executed by a computer processor enables the computer processor to perform a method for managing data the method comprising:
generating, by an offload device, predicted active logical partition data using an active logical partition mapping obtained from a host computing device;
generating logical partition correlation data using active memory track maps obtained from the host computing device;
generating most probable tracks using the predicted active logical partition data and the logical partition correlation data; and
sending the most probable tracks to the host computing device,
wherein the host computing device evicts data from one or more memory devices based on the most probable tracks.

9. The non-transitory computer readable medium of claim 8, wherein each memory device comprises at least a plurality of memory slots.

10. The non-transitory computer readable medium of claim 8, wherein the active logical partition mapping specifies a plurality of logical partitions, wherein each of the plurality of logical partitions are associated with a persistent storage device in the host computing device.

11. The non-transitory computer readable medium of claim 8, wherein the method further comprises:
performing an error analysis on the most probable tracks to generate an error score; and
generating an error report based on the error score.

12. The non-transitory computer readable medium of claim 11, wherein the error score is sent to the host computing device if the error score exceeds a significance of error.

13. The non-transitory computer readable medium of claim 8, wherein the predicted active logical partition data is generated after an active logical partition predictor (ALPP) time interval.

14. The non-transitory computer readable medium of claim 8,
wherein the active memory track maps specify a plurality of active tracks, and
wherein each active track in the plurality of active tracks is associated with at least one logical partition.

15. An offload device system, comprising:
a processor;
memory comprising instructions, which when executed by the processor, perform a method, the method comprising:
generating, by an offload device, predicted active logical partition data using an active logical partition mapping obtained from a host computing device;
generating logical partition correlation data using active memory track maps obtained from the host computing device;
generating most probable tracks using the predicted active logical partition data and the logical partition correlation data; and
sending the most probable tracks to the host computing device,
wherein the host computing device evicts data from one or more memory devices based on the most probable tracks.

16. The offload device of claim 15, wherein the memory device comprises at least a plurality of memory slots.

17. The offload device of claim 15, wherein the active logical partition mapping specifies a plurality of logical partitions, wherein each of the plurality of logical partitions are associated with a persistent storage device in the host computing device.

18. The offload device of claim 15, wherein the offload device is further programmed to:
perform an error analysis on the most probable tracks to generate an error score; and
generate an error report based on the error score.

19. The offload device of claim 18, wherein the error score is sent to the host computing device if the error score exceeds a significance of error.

20. The offload device of claim 15, wherein the predicted active logical partition data is generated after an active logical partition predictor (ALPP) time interval.

* * * * *